United States Patent [19]

Vente et al.

[11] Patent Number: 4,935,187

[45] Date of Patent: Jun. 19, 1990

[54] PROCESS FOR THE MANUFACTURE AND SEPARATION FROM THE MOLD OF INJECTION MOLDED ARTICLES

[75] Inventors: Paul Vente; Johann-Nikolaus Meussdoerffer, both of Leverkusen, Fed. Rep. of Germany

[73] Assignee: Bayer Aktiengesellschaft, Leverkusen, Fed. Rep. of Germany

[21] Appl. No.: 373,624

[22] Filed: Jun. 29, 1989

Related U.S. Application Data

[63] Continuation of Ser. No. 163,912, Mar. 3, 1988, abandoned.

[30] Foreign Application Priority Data

Mar. 19, 1987 [DE] Fed. Rep. of Germany ........ 3708905

[51] Int. Cl.$^5$ .............................................. B29C 45/43
[52] U.S. Cl. .................................. 264/328.1; 264/335; 264/336; 425/437; 425/556
[58] Field of Search ...................... 264/328.1, 334, 335; 425/556, 437; 249/66.1

[56] References Cited

U.S. PATENT DOCUMENTS

| | | | |
|---|---|---|---|
| 4,438,065 | 3/1984 | Brown | 264/335 |
| 4,442,055 | 4/1984 | Oelseh et al. | 264/294 |
| 4,521,367 | 6/1985 | Underwood | 264/335 |

FOREIGN PATENT DOCUMENTS

| | | |
|---|---|---|
| 0121316 | 10/1984 | European Pat. Off. . |
| 2224893 | 12/1973 | Fed. Rep. of Germany . |
| 1017308 | 12/1952 | France . |
| 1139182 | 6/1957 | France . |
| 1216466 | 4/1960 | France . |

OTHER PUBLICATIONS

Gastrow, Hans, "Der Spritzgieβ-Werkzeugbau", 1982.

Primary Examiner—Jill L. Heitbrink
Attorney, Agent, or Firm—Sprung, Horn, Kramer & Woods

[57] ABSTRACT

A process for the manufacture of injection molded articles out of material that is capable of being processed in an injection molding process comprising injection fluid material into a hollow space of a mold of a desired form, hardening or reacting the injected material at raised temperatures and subsequently separating the molded article from the mold at the same high tempeature by the aid of inert gas and/or air, pressed between the molded article and the mold, which is regulated by a self readjusting conical valve.

2 Claims, 2 Drawing Sheets

PROCESS FOR THE MANUFACTURE AND SEPARATION FROM THE MOLD OF INJECTION MOLDED ARTICLES

This application is a continuation of application Ser. No. 163,912, filed Mar. 3, 1988 now abandoned.

BACKGROUND OF THE INVENTION

1. Field of the Invention

The present invention relates to a process for the manufacture of molded articles out of injection molding material in which the molded articles are separated from the mold with the aid of air and/or inert gas. The process is especially suitable for the manufacture of injection molded parts out of fluid silicone rubber.

2. Background Information

The manufacture of injection molded articles is an often used method for manufacturing molded articles. Examples of suitable materials capable of being injection molded include polyethylene, polypropylene, polycarbonate, PVC, polyslyrol, ABS, polyacelale HDPE, polyterephthalale, polyamide and silicone rubber (c.f., e.g., Hans Gastrow, "Der Spritz-giess Werkzeugbau", Hanser-Verlag 1982).

Recently this technology has also been employed in the manufacture of molded articles out of silicone rubber.

The careful automatic extraction of molded articles to be produced represents a problem in injection molding technology.

It is known that in the extraction of flat or humped molded articles usually out of the female mold or out of the core ejection pads or rods for lifting the finished part out of the mold in order to enable subsequent ejection can be used. This state of the art, however, has a significant disadvantage in that is known that rubber, especially silicone rubber, has a very low initial tearing resistance and a very low resistance to tear propagation under the usual deformation conditions in the high temperatures of up to 250° C. prevailing in the mold, thus it is almost unavoidable that the finished parts are teared and/or punctured by the exiting rods and thereby causing damage. Cooling down of the mold after vulcanization for the purpose of careful removal from the mold is not practicable for economic reasons.

In other practiced processes for removal from the mold, compressed air is sometimes additionally blown in across the exiting rods and their slaving, in order to support the removal from the molds. This process, however, has additional latent problems, namely during the injection process, the returned ejector rods ought to be locked-off tight with the slaving against non-vulcanized rubber flowing in, in order to prevent spraying (flash), which otherwise results in expensive subsequent processing of the parts; for non-vulcanized rubber, especially silicone rubber, such rubber reaches an extremely low viscosity at high temperatures and especially under great shearing stress and can easily flow under pressure into all kinds of parting planes and gaps. However, as the mold must be run al temperatures up to 250° C., under these conditions the parts must remain easily practicable, an unsatisfactory compromise must usually be reached here. In addition, in working with parts used in this manner, it turns out that the rubbers to be processed in this regard have an enormous abrasive effect and quickly bring about wear and thus an increase of clearance in the slaving.

Such constructions therefore enable, at best a short-term satisfactory running of the installation.

SUMMARY OF THE INVENTION

The object of the present invention is a process for the manufacture of injection molded articles by injecting fluid material in the hollow space of an appropriate mold, hardening or reacting the material to be hardened at raised temperatures and subsequent separation of the molded article from the mold, which is characterized in that air and/or inert gas is forced across a floating caliper conical valve and the molded article is thereby separated from the mold.

DETAILED DESCRIPTION OF THE INVENTION

Figure 1:
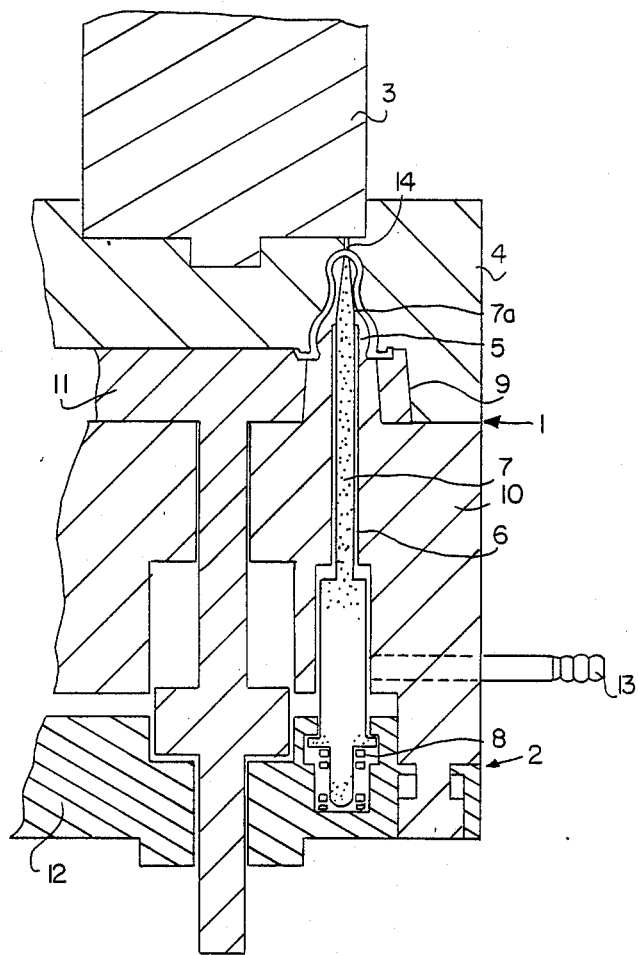
FIG. 1 is a cross-sectional view of an injection molding apparatus.
Figure 2:
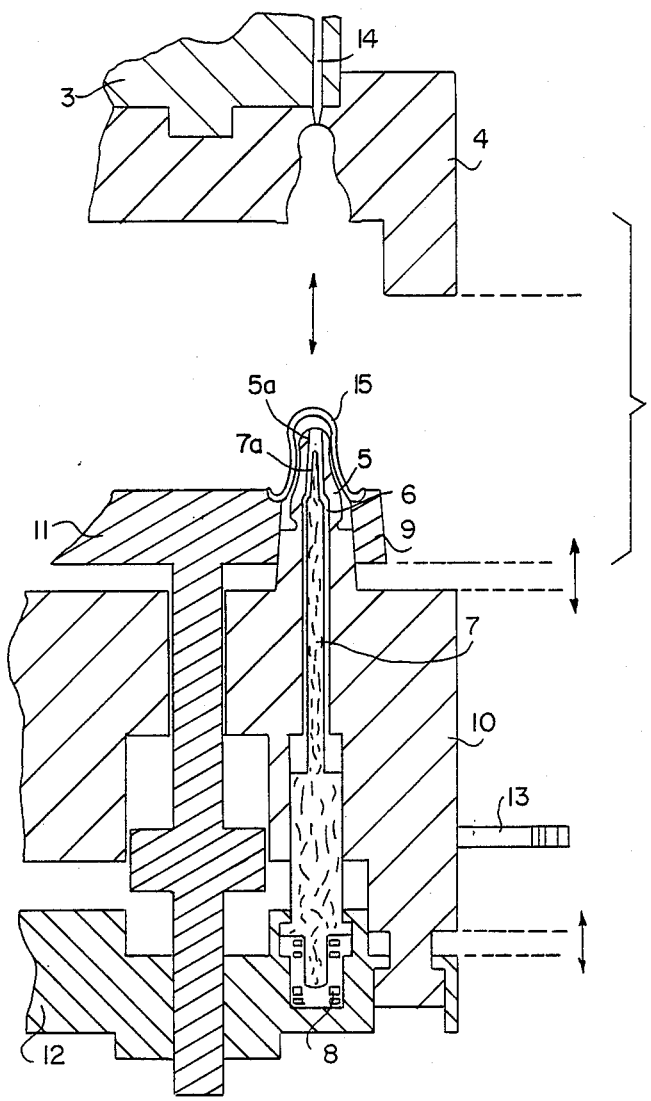
FIG. 2 is a cross-sectional view of an injection molding apparatus as depicted in FIG. 1, but in an open mold configuration.

Referring now to FIGS. 1 and 2, the injection molding apparatus includes a cold channel part 3 for injecting material through channel 14, a heated female part 4 of the mold which receives the heated male part including core 5 and base 10 which has a gas or air channel 6 closeable by a valve 7, which is biased upwardly by disc-spring assembly 8. The gas channel 6 is fed by air/gas inlet 13. Valve 17 and base 10 are held in clamping plate 12 along with stripper plate 9, 11.

FIG. 1 shows the mold in a closed position and FIG. 2 shows the mold in an open position with the molded article 15 being removed by stripper plate 9 as a result of movement of stripper plate 9 and female part 4 at split line 1 and male part 10 at split line 2.

As may be seen from FIG. 1 or FIG. 2, in the process only a valve 7, conically shaped at its end 7a, travels back instead of an ejector rod, with or without the support of air, so that the finished part 15 is simply blown off by a short blast of air during the mold opening process, without further mechanical damage due to ejector rods being possible. The conically shaped valve 7, 7a has in addition the advantage that it is always pressed with maximal force against the valve face 5a, e.g. by a disc-spring assembly 8, and streaming in to channel 6 of the nonvulcanized rubber is rendered impossible; abrasion effects due to the rubber or due to the mechanical strain of the valve 7 at high temperatures are thereby always automatically compensated. A one-sided stress of the valve 7 can additionally be compensated by rotating it automatically through a certain angle about its axis when the mold is open, as is customary in motor vehicle motors.

The production process then takes place with the help of the construction of the invention as follows: with the mold closed, the conical valve 7a is pressed optimally against the valve face 5a, e.g., by the a disc-spring assembly 8, so that the rubber to be vulcanized can flow only into the cavity of the mold across a hot channel or cold channel system. After vulcanization, the mold opening takes place in the parting plane 1 (FIG. 1) and in opening of the tool across spring assemblies (not shown) within the region of clearance in the parting plane 2; the valve 7 travels back relative to mold parts 5, 10 opening and permitting channel 6 air streams from under the finished article 15 from inlet 13 to blow it out of the core 5. This air stream for the blowing-out and pushing-out processes can be connected with the other valves across communicating channels or provided individually across a programmed control.

Besides diverse thermoplastics, the elastomer LSR (liquid silicone rubber) equally to be processed in the injection molding, has become of significant technological significance.

By the term LSR is understood a fluid low-component silicone rubber, which, after mixing of both components in a 1:1 ratio through a platinum catalyst present in one of the two components, vulcanizes at raised temperatures; the vulcanization here depends on the addition crosslinking principle and occurs within a very short period of time at temperatures of 100° C. to 230° C.

The vulcanized materials distinguish themselves by the following characteristics, such as high heat resistance, good low-temperature resistance and flexibility in the cold, good rubber mechanical characteristics, excellent ageing characteristics, excellent dielectric behaviour and especially physiological indifference. The low-inflammability silicone rubber does not melt during burning and develops no poisonous gases.

Examples for the use of LSR are found in automobile and machine construction, in electrotechnology and electronics, in the domestic area or in the pharmaceutical sector.

The blowing-off device described in the aforesaid invention is used especially in all articles resembling hollow bodies, membrane caps, baby dummies, tubes and similar articles. This principle of blowing-off can also be used independently of this list with all other shapes.

It will be appreciated that the instant specification and claims are set forth by way of illustration and not limitation, and that various modifications and changes may be made without departing form the spirit and scope of the present invention.

What is claimed is:

1. A process for the manufacture of injection molded articles out of a material that is capable of being processed in an injection molding process comprising injecting fluid material into a hollow space of a mold of a desired form, hardening or reacting the injected material at a raised temperature and subsequently separating the molded article from the mold at said raised temperature solely by inert gas, air or inert gas and air pressed between the molded article and the mold whereby to blow off the molded article during a mold opening operation, wherein the air or gas is regulated by a conical valve and wherein when the mold is closed, the valve is pressed with maximal force against a valve face by a disc spring assembly to allow the fluid material to flow only into the hollow space of the mold.

2. A process according to claim 1, wherein the molding material is fluid silicone rubber.

* * * * *